Sept. 29, 1964
M. LOGEZ ETAL
3,150,476
AUTOMATIC INSERTION UNIT
Filed May 22, 1961
2 Sheets-Sheet 1
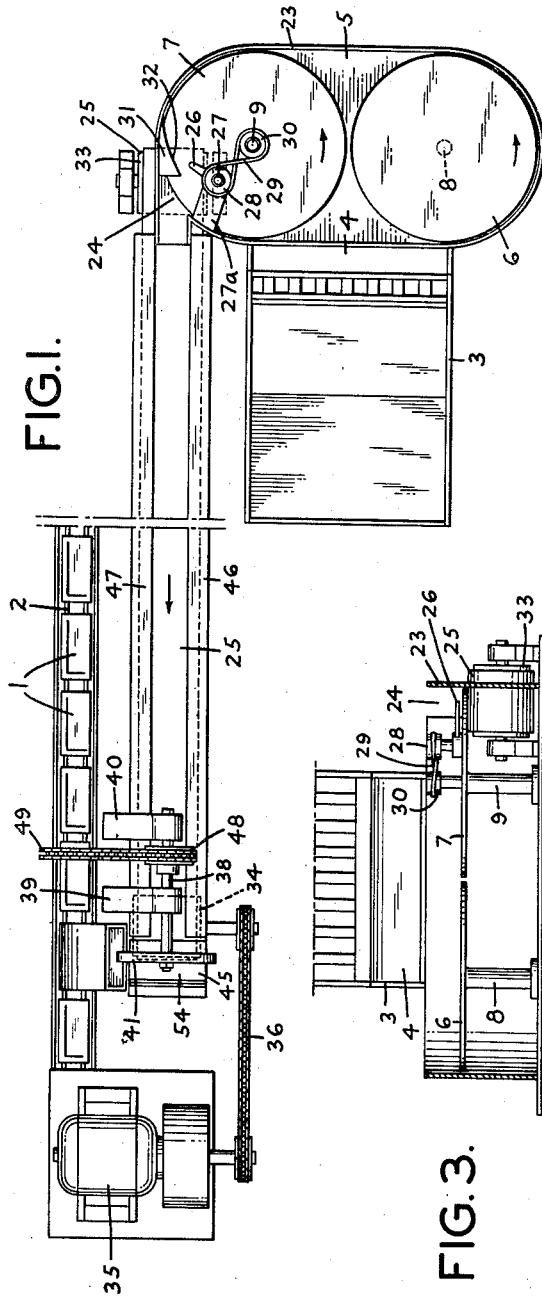
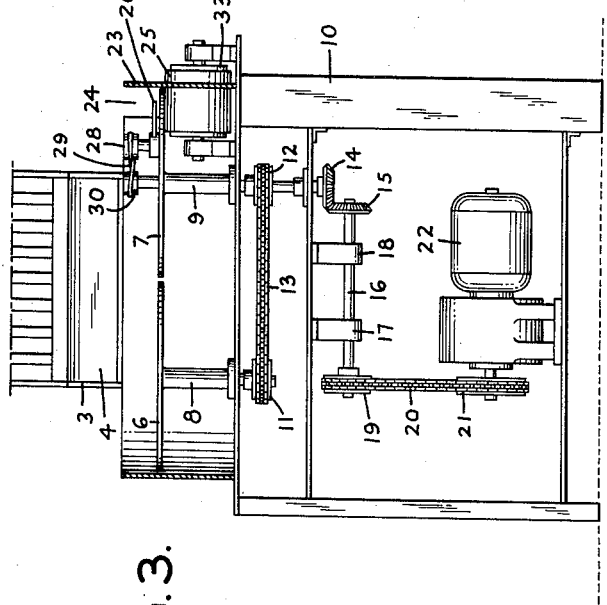
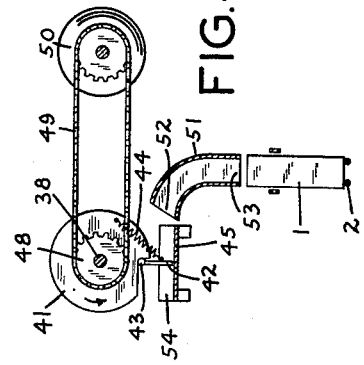
INVENTORS:
MAURICE LOGEZ
PIERRE MARQUANT
BY
THEIR ATTORNEYS

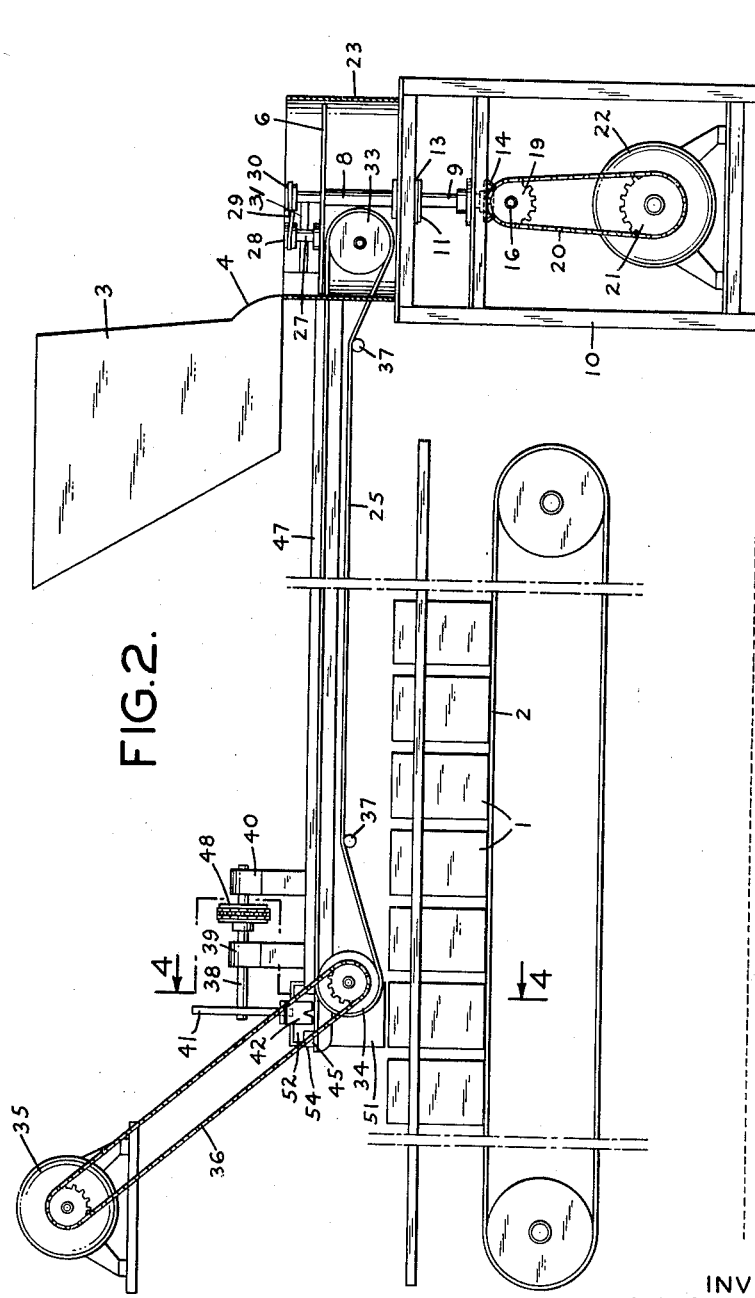

United States Patent Office 3,150,476
Patented Sept. 29, 1964

3,150,476
AUTOMATIC INSERTION UNIT
Maurice Logez, Aubervilliers, and Pierre Marquant, Paris, France, assignors to Lever Brothers Company, New York, N.Y., a corporation of Maine
Filed May 22, 1961, Ser. No. 111,840
Claims priority, application France May 20, 1960
2 Claims. (Cl. 53—250)

This invention relates to feeding and dispensing devices, and it relates particularly to machines for introducing articles, such as premiums, prizes, and advertising material, such as booklets and pamphlets, into receptacles, such as cartons, boxes, packages and the like containing or adapted to be filled with detergents, cereals and other products.

It has been common practice to insert premiums, advertising material and the like by hand into boxes containing materials of the type mentioned above. Such manual operations are expensive and slow and leave a great deal to be desired especially in cases where the receptacles are filled at high production rates.

In order to overcome the disadvantages of manual introduction of articles in boxes, machines have been proposed heretofore for accomplishing this result. However, these machines are complex, require accurate timing and regulation of the components thereof, and moreover are prone to malfunction.

In accordance with the present invention, machines are provided whereby articles such as premiums, prizes, advertising material and the like are supplied in no predetermined order and are sorted and accumulated in a row from which each successive leading article can be discharged in accurately timed relation into successive receptacles in a row.

More particularly, in accordance with the present invention, the articles to be introduced into the containers or receptacles are discharged from a source of supply, such as a hopper, onto a sorting table which discharges the articles onto a conveyor where a plurality of the articles are formed in a row and advanced against a stop member which positions the leading article in the row and enables it to be discharged by means of a suitable discharging article into a chute or guide means leading to successive receptacles being advanced along in a row by means of a conveyor.

The sorting device by means of which the articles are arranged in a row includes a pair of rotatable plates which are so arranged that the articles received on one plate are thrown onto the other plate which discharges the articles one by one through an opening onto a moving conveyor belt having a stop member located to engage the leading article in the row. The conveyor belt is adjusted to travel at a higher speed than that required for supplying articles to the moving row of receptacles. Successive leading articles in the row are discharged from the row by means of a rotary member having a finger or arm thereon which is arranged to engage the leading article and push it transversely into a chute which delivers the article into a receptacle passing beneath the discharge end of the chute. In this way, only the rotary discharging member and the conveyor by means of which the row of receptacles is moved need to be synchronized and inasmuch as both the conveyor and the rotary member can be interconnected, their timing can be closely controlled and malfunctioning avoided.

For a better understanding of the present invention, reference may be had to the accompanying drawings in which:

FIGURE 1 is a plan view of a typical feeding and dispensing machine of the type embodying the present invention;

FIGURE 2 is a side elevational view of the machine partially broken away;

FIGURE 3 is a front elevational view of the machine looking from the right-hand side of FIGURE 2; and FIGURE 4 is a view in section taken on line IV—IV of FIGURE 2.

In the machine chosen for purposes of illustration, a row of cartons 1, filled or partially filled with detergents, cereals or the like, is moved along a straight line path by means of a conveying device such as the conveying belt 2 to receive articles such as premiums, prizes, advertising pamphlets, booklets and the like, supplied from a suitable supply source such as the hopper 3. The articles to be inserted in the cartons, for example, a small premium, are received in the hopper 3 in no predetermined order and are discharged in more or less random relation through a discharge opening 4 in the hopper onto a horizontal table 5. Two substantially identical disc-like plates 6 and 7 are fitted in the table with their upper surfaces flush with the upper surface of the table 5. Means are provided for rotating the disc-like plates 6 and 7 in the same direction. To that end, the plates 6 and 7 are mounted on vertical shafts 8 and 9 which rotate in bearings mounted in a supporting stand or frame 10. Sprockets 11 and 12 are fixed to the shafts 8 and 9, respectively, and are coupled for simultaneous rotation in the same direction by means of a chain 13. A bevel pinion 14 is fixed to the shaft 9 and engages another pinion 15 mounted on the end of an intermediate driven horizontal shaft 16. Two bearings 17 and 18 are also mounted on the stand or frame 10 and support the shaft 16 for rotation. A sprocket 19 is mounted on the shaft and is driven by means of a sprocket 21 and a chain 20. An electric motor 22 drives the sprocket 21 through a reducing gear of conventional type.

A vertical peripheral wall 23 extends around the table 5 and the plates 6 and 7 in close proximity to the peripheries of the plates. An opening 24 is provided in the wall 23 adjacent to the plate 7 and has a lower edge disposed substantially in the plane of the plate 7.

A conveyor belt 25 extends from adjacent to the opening 24 in a direction substantially parallel with the conveyor 2 but on a higher level than the conveyor 2. The uppermost flight of the conveyor 25 is disposed below the plate 7 as best shown in FIGURE 3.

Articles to be introduced into the receptacles 1 are discharged from the table through the opening 24 onto the belt 25 which serves to accumulate and advance a row of the articles. In order to assure feeding or discharge of the premiums or other article from the table and plate 7, a finger 26 is mounted above but adjacent to the upper surface of the plate 7 and inwardly and slightly in advance of the opening 24 in the direction of rotation of the plate 7. A shaft 27 rotatably mounted in an arm 27a extending inwardly from the wall 23 is fixed to the finger and is rotated in a direction counter to the direction of rotation of the plate 7 by means of a pulley 28 on the upper end of the shaft 27. A crossed belt 29 connects the pulley 28 to a pulley 30 on the upper end of the shaft 9. Also to aid in deflecting the uppermost of superimposed articles away from the discharge opening 24, the wall 23 is provided with an inwardly extending guide plate or arm having an edge 32 which curves inwardly from the wall toward the finger 26 in the direction of rotation of the plate 7. The arm 31 is spaced from the upper surface of the plate 7 a distance slightly greater than the thickness of the article to be discharged.

When the articles from the hopper 3 fall upon the table 5 and the rotary plates 6 and 7, the articles are transferred in no predetermined order and in some cases in superimposed relation onto the plate 7 and are carried toward the discharge opening 24. If articles are superimposed, the uppermost article or articles are pushed off the lowermost article by means of the edge 32 of the arm 31 while the lowermost article is carried by the plate toward the discharge opening. If the article is misaligned so that it cannot pass through the opening 24, the counter-rotating finger 26 will straighten out the article and will align it with the opening for discharge onto the conveyor 25. Other articles approaching the opening 24 are deflected back toward the center of the plate 7 by means of the finger 26 and are discharged from the table 5 later through the opening 24.

As shown in FIGURE 2, the end of the conveyor belt 25 adjacent to the table 5 is supported by a rotary drum or roller 33 while its opposite end is supported by a driven drum or roller 34.

An electric motor 35 is connected by means of a chain 36 or belt to the roller or drum 34 to cause the upper flight of the belt to move from right to left as viewed in FIGURE 2, bearing a row of articles therealong.

Above the left-hand end of the conveyor belt 25 as viewed in FIGURE 1 is a shaft 38 which is rotatably supported in the bearings 39 and 40 on an extension of the frame 10 or an independent supporting element. A disc 41 is mounted on the shaft 38 which is rotated in timed relation to the motion of the conveyor 2 by suitable mechanism described hereinafter. The disc 41, as shown in FIGURE 4, has finger 42 connected to it by means of a pivot 43. The finger 42 is biased in a counter-clockwise direction, as viewed in FIGURE 4, to a substantially radial position by means of a spring 44. Below the disc 41 is a platform 45 onto which the articles on the conveyor belt 25 are discharged. Guide flanges 46 and 47 maintain the alignment of the articles on the conveyor 25 and guide the leading article onto the platform and into alignment with a discharge conduit or chute 51 which has a mouth 52 on one side of the platform 45 and a discharge opening 53 disposed above the receptacles 1 on the conveyor 2. As the disc 41 is rotated the finger 42 engages and pushes the article in engagement with the stop 54 into the mouth 52 of the chute 51 which directs the article into the receptacle beneath discharge opening 53 of the chute. If an article should jam on entering the chute, the finger 42 can retract against the tension of the spring 44 to avoid damage. Inasmuch as the disc 41 controls the discharge of articles into the receptacles 1, the rate at which the articles are discharged from the hopper 3, the speed of the rotary plates 6 and 7 and the conveyor 25 do not require synchronization other than to be sufficiently high to keep the conveyor 25 full.

A stop bar or flange 54 on the platform 45 aligns the leading article in the row supplied by and supported on the conveyor belt 25 with the mouth 52 of the chute 51.

In operation, the discharging disc 41 is rotated by means of a sprocket 48 and a connecting chain 49 and motor 50 in synchronization with the movement of the row of receptacles 1 so that the disc 41 makes one revolution as each receptacle passes beneath the chute to make certain that one article is introduced into each of the receptacles 1 passing therebeneath.

It will be understood of course that the arrangement of elements is susceptible to considerable variation and the drive means for the various operating parts thereof may be modified as may be desirable. Moreover, the size and proportions of the parts may be altered as may be required for supplying articles of different shapes and sizes to receptacles of different capacities. Accordingly, the form of the invention described herein should be considered as illustrative and not as limiting the scope of the following claims.

We claim:

1. Apparatus for supplying articles to receptacles comprising means for advancing a row of articles, stop means for engaging the leading article in said row, a rotatable shaft extending lengthwise of and above said means for advancing said row, means for rotating said shaft about its axis, a finger mounting member secured to said shaft for rotation therewith, a finger member extending substantially radially from and movably mounted on said finger mounting member adjacent to said stop means, biasing means for urging said finger in the direction of rotation of said finger to engage said leading article and push it out of said row as said finger mounting member rotates, said biasing means enabling said finger to move relative to said finger mounting member in a direction opposite to the direction of rotation of said finger mounting member and a chute for receiving the articles and discharging them downwardly.

2. An apparatus for supplying articles to receptacles, comprising an elongated conveyer for moving a row of articles in one direction, stop means adjacent to one end of said conveyer for engaging and stopping the leading article of said moving row, a rotatable shaft extending lengthwise of and above said conveyer, a finger mounting member secured to said shaft for rotation therewith, a radial finger member pivotally mounted on said finger mounting member adjacent to said stop means and rotatable with said finger mounting member, means for rotating said finger mounting member to move said finger across said row of articles and engage the leading article of said row and push it transversely out of said row, a chute for receiving said article and discharging it downwardly, and spring means biasing said finger member in the direction of rotation of said finger mounting member and resiliently retaining it substantially radial to said finger mounting member to permit said finger member to retract in a direction opposite to the direction of rotation of said finger mounting member.

References Cited in the file of this patent

UNITED STATES PATENTS

| 1,445,296 | Clark | Feb. 13, 1923 |
| 2,382,863 | Decker et al. | Aug. 14, 1945 |
| 2,440,866 | Malhiot | May 4, 1948 |
| 2,470,795 | Socke | May 24, 1949 |
| 2,515,965 | Nurnberg | July 18, 1950 |
| 2,737,286 | Kibler et al. | Mar. 6, 1956 |
| 2,739,432 | Hirschey | Mar. 27, 1956 |
| 2,829,476 | Engleson et al. | Apr. 8, 1958 |
| 2,907,159 | Allen | Oct. 6, 1959 |
| 2,935,827 | Burt | May 10, 1960 |

FOREIGN PATENTS

| 311,002 | Switzerland | Jan. 14, 1956 |